July 24, 1928.
C. E. HANON
1,678,115
GASOLINE GAUGE
Filed July 12, 1926
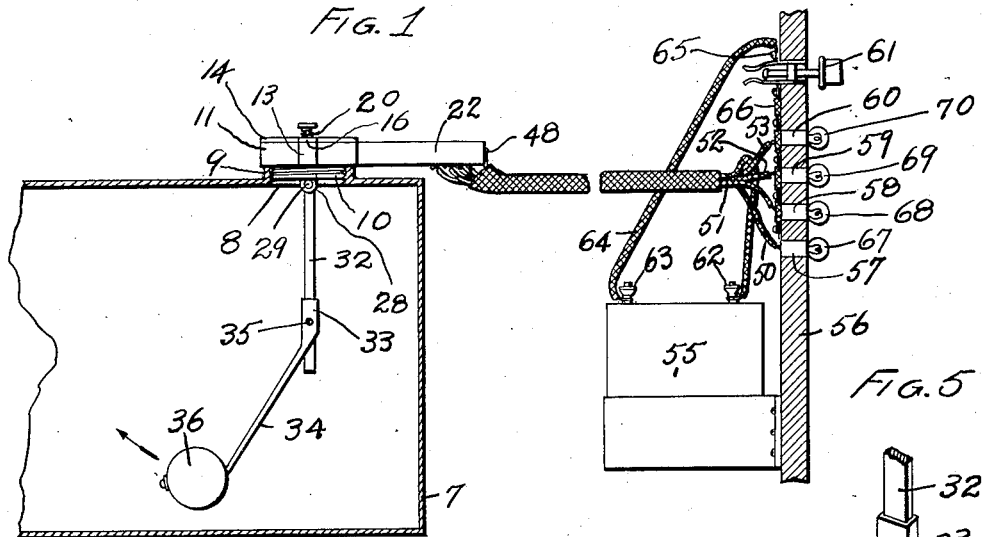
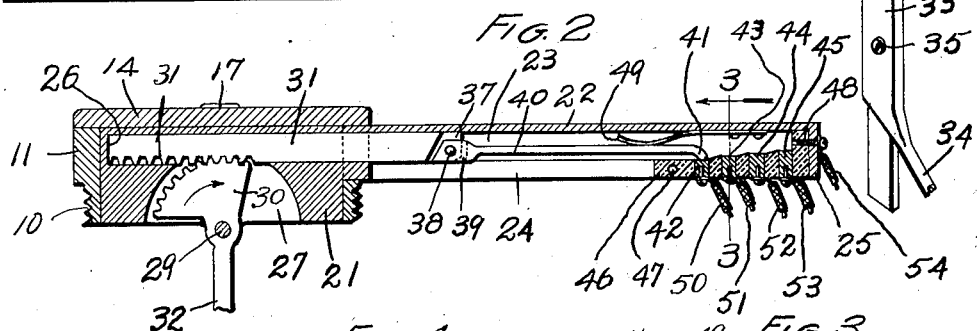
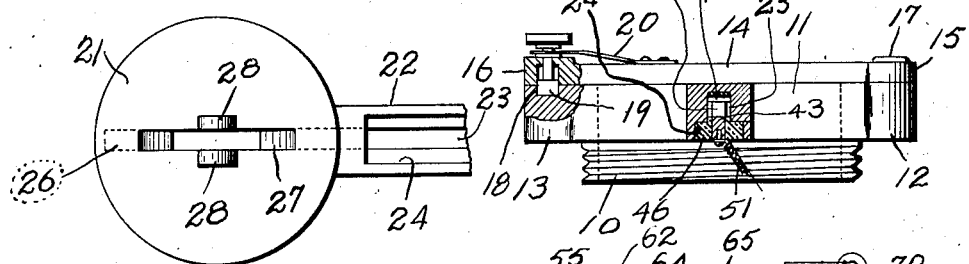
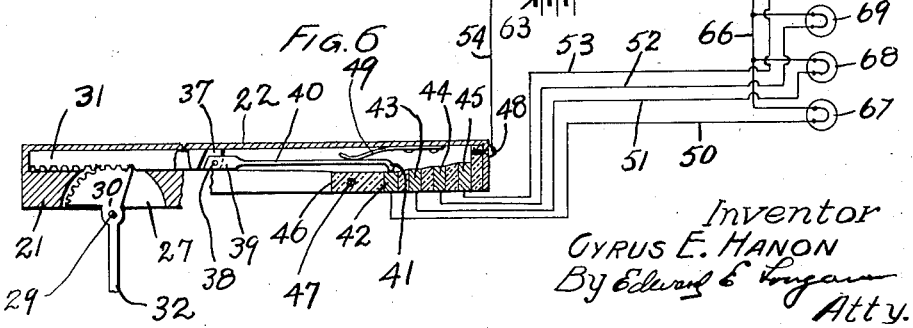
Inventor
CYRUS E. HANON
By Edward E. Logan
Atty.

Patented July 24, 1928.

1,678,115

UNITED STATES PATENT OFFICE.

CYRUS E. HANON, OF ST. LOUIS, MISSOURI.

GASOLINE GAUGE.

Application filed July 12, 1926. Serial No. 122,022.

My invention relates to improvements in gasoline gauges, and has for its primary object a gauge which will indicate the approximate amount of gasoline within the fuel tank of a motor vehicle and in which the indication can be clearly read or noted in the dark as well as in the light.

A further object is to construct a gasoline gauge in which the indication or indicator can be turned off and on as it is electrically operated and thereby the electric energy conserved.

A still further object is to construct an electric gasoline gauge in which the contact arm moves longitudinally over a series of electric contacts, each succeeding contact being higher than the preceding one so that there is no danger of the arm making contact at two points simultaneously.

A still further object is to construct a gasoline gauge electrically operated in which the electric contacts are far removed from the container opening so that there will be no possibility of an electric spark igniting any gases, which may rise from the container.

In the drawings:

Fig. 1 is a sectional view showing part of a tank with the operating mechanism therein and part of an instrument board having the indicator mounted thereon together with the electric contacts.

Fig. 2 is an enlarged longitudinal section of the contact housing with parts of the mechanism broken away.

Fig. 3 is a section taken on the line 3—3 of Fig. 1.

Fig. 4 is a bottom plan view of a portion of the contact housing.

Fig. 5 is an enlarged perspective view of the operating lever and the float arm illustrating the manner of adjustably attaching the same together; and Fig. 6 is a diagrammatic view showing the manner of making electric connections.

In the construction of my device I employ a gasoline tank 7 which is of any desired shape or size. This tank is provided in its top with a circular opening 8. The opening 8 is surrounded on the upper face of the tank with a screw threaded flange 9. These screw threads are internally formed and engage with screw threads 10 formed on the ring 11. The ring 11 is provided with diametrically opposite outwardly extending projections 12 and 13. Mounted on the ring 12 is a cover 14 which is provided with similar projections 15 and 16. Passing through the projection 15 and secured in the projection 12 is a pivot 17. The projection 13 is provided with a bore 18 in which the latch 19 carried by the cover 14 is adapted to be seated by means of the spring 20 thereby holding the cover against turning. The purpose of this cover will be explained in detail later.

Carried by the ring 11 is a cylindrical plug 21 which has projected radially therefrom an arm 22. The arm 22 is opened at its bottom throughout the major portion of its length and is provided with recesses 23 and 24, which extend longitudinally, the recess 24 being wider than the recess 23 and adjacent the bottom edge so as to form shoulders. The outward end of the arm is closed as indicated by the numeral 25. Within the plug 21 and in alignment with the recess 23 is formed a diametrically extending slot 26. The plug 21 is also provided with a pocket 27 which communicates with the recess 26 and on either side of the pocket and located centrally of the plug and projecting from its bottom face are ears 28, which are provided with an opening for the reception of the rod or stud 29. On this stud and projecting into the pocket 27 is a segmental gear 30, the teeth of which mesh with the rack 31 slidably mounted in the recess 26. The segment is also provided with a downwardly projecting arm or lever 32 which passes through a sleeve 33 formed on the upper end of the float arm 34. The float arm is held on the lever in adjusted position by means of screws or pins 35. On the lower end of the float arm is secured a float 36. This float may be of any desired shape and may be of any material which will float in liquid. It will be noted from Fig. 1 that the float is arranged to one side of the pivot 29. The purpose of this is that when the float rises by means of the liquid being put into the tank, it will always rotate the segment in the direction indicated by the arrow in Fig. 2. The rack 31 extends into the recess 23 and is provided on its outer end with a tongue 37.

Pivotally secured to the tongue 37 by means of a pivot 38 is the bifurcated end 39 of the contact arm 40. The contact arm is provided on its free end with a down-turned portion 41 which is designed to ride on the contact plates 42, 43, 44 and 45. These contact plates are molded or otherwise secured in a body of insulating material 46. This insulating material is held in position by means of a pin 47 and by means of the screw 48, and is prevented from passing too far up into the arm by reason of the shoulders formed by the recesses 23 and 24.

The contact arm is held in constant engagement with one of the contact plates by means of a spring 49 which is carried by the arm 37. Secured to the contact 42 is a conductor 50, to the contact 43 a conductor 51, to the contact 44 a conductor 52, and to the contact 45 a conductor 53. While secured to the housing or rather end 25 by means of the screw 48 is a conductor 54, which acts as a ground wire from the battery 55. It will be noted from Figs. 2 and 6 that the contact 43 is higher than the contact 42, the contact 44 slightly higher than the contact 43, and the contact 45 the highest of all. The body of insulation between these contacts inclines upwardly so that as the contact arm is moved forward, it will readily pass from one contact to the other. 56 represents the instrument board of a motor vehicle. This instrument is provided with a plurality of electric sockets 57, 58, 59 and 60. It is also provided with a switch 61. The conductor 55 is secured to the binding post 62 of the battery 55, and to the post 63 of the battery is secured a conductor 64, the opposite end of which is conducted to one post 65 of the switch. To the other post of the switch is secured a conductor 66 which in turn is secured to each of the sockets. Within the sockets are mounted electric bulbs 67, 68, 69 and 70. These bulbs are preferably each of a different color, the lowermost being red. The conductor 50 is also connected in such a manner as to complete the electric circuit through and light the bulb 67, the conductor 51 completing the circuit to the bulb 68, the conductor 52 completing the circuit to the bulb 69, and the conductor 53 completing the circuit to the bulb 70 when the switch 61 is closed.

While I have shown my device as being connected to a battery carried by the instrument board, I do not desire to limit myself thereto as the source of electrical energy may also be a storage battery such as is commonly used for starting and lighting purposes in a motor vehicle. One of the important features of my device is the step arrangement of the contacts located in the arm 22 because by this arrangement there will be no possibility of the contact arm 40 contacting with two of the contacts simultaneously even in the event that the point 41 should wear down completely.

Another important feature of my structure is that the housing 21 can be removed from the ring 11 by merely swinging the lid to one side. This makes my device applicable to all types of gasoline tanks as the same can be installed in the filling opening and when refilling the tank, the housing 21 can be readily removed together with the float mechanism and after the tank has been recharged with fuel, the housing re-inserted. Of course where the tank is provided with a gauge opening and also with a filling opening, my device will be installed through the gauge opening so that it will not have to be removed when filling the tank.

The operation of my device is as follows: The ring 11 is first secured in position in either the filling opening or the present gauge opening of a fuel tank after which the housing, to which the electric conductors have been properly attached, is inserted in the ring. The float 36 having been so adjusted that when the tank is emptied, it is in proximity to the bottom of the tank but not quite touching it so that the lever 32 will hang vertically thus leaving the end 41 of the contact lever resting on the contact 42.

The opposite ends of the conductors are attached to the respective lamp sockets as illustrated in Figs. 1 and 6. The conductor 54 is attached to one post of the battery, the conductor 64 to the opposite post of the battery and to one post of the switch 61, the conductor 66 is attached, as previously described, and the device is ready for operation.

By closing the switch 61, contact is made in the following manner from the post 63 through the conductor 64 to the switch. Thence through the switch to the socket 57. Thence through the wire 50 to the contact 42. Then through the contact arm 40 through the spring 49 to the arm 22 and thence return to the battery by means of the conductor 54. As the tank is gradually filled with liquid, the float commences to rise and in so doing rocks the lever 32, rotating the segment 30 thus moving the rack 31 forward. This in turn moves the contact arm 40 forward causing the end 41 to leave the contact 42, ride up on the inclined face of the insulation and on to the contact 43 where a circuit is completed through the conductor 51 to the lamp 68, this contact, however, being made only after the tank is filled to one-half of its capacity. A further filling of the tank moves the contact arm 40 to the contact 44 where a circuit is completed through the conductor 52 illuminating the lamp 69, this light indicating that the tank is approximately three-fourths full. Further filling of the tank pushes the contact arm forward until it rests on the contact 45 when the circuit is completed through the conductor 53 illuminating the lamp 70 indicating that the container is full or rather that its contents are somewhere between three-fourths full and completely full.

In order to save both bulbs and battery, the switch 61 is left open unless it is desired to ascertain the amount of fuel in the tank. This can be readily done by merely closing the switch and observing which light is lit, and when the lamp 67, which is preferably red, ignites, this is the danger signal showing that the fuel is low and that it is necessary to refill the tank.

It will be noted from Fig. 2 that the rearward movement of the arm 40 is controlled by the rear end of the rack 31 coming in contact with the rear wall of the opening 26 formed in the housing 21 while the forward movement of the arm 40 is limited by it coming in contact with the insulation adjacent the closed end of the arm 22 so that at no time can the contact point 41 of the arm 40 ride past the contact 42 in one direction nor can it ride past the contact point 45 in the opposite direction.

It is preferable when taking a reading of my device that the vehicle be in motion so that there will be a slight movement of the float 36. The purpose of this is that in the event that if the end 41 of the contact arm 40 be on the insulation between two of the contacts, enough movement will be inserted thereto to cause it to move forward and back and come in contact with one of these contacts thereby illuminating one of the lamps.

It is my intention also to house all of the conductors 50, 51, 52, 53 and 54 in a cable as illustrated in Fig. 1 and have the conductors of various colors so that the proper connections can be made and the device installed without the aid of an experienced electrician.

Having fully described my invention, what I claim is:

1. In a gasoline gauge a circuit controller comprising a housing having an arm projecting therefrom, a plunger slidably located in said housing and arm, a contact arm pivotally secured at one end to said plunger and movable longitudinally in said arm, a plurality of longitudinally spaced contact plates located in said arm and adapted to be sequentially contacted with by said contact arm, means for securing said housing to a liquid container, and means carried by said housing and located within said container whereby the rise and fall of liquid in said container imparts a longitudinal movement to said plunger and contact arm.

2. In a gasoline gauge a circuit controller comprising a housing having an arm projecting radially therefrom, a plunger slidably located in said housing and arm, a contact arm pivotally secured to said plunger at one end, its opposite end having a downwardly extending portion, a plurality of longitudinally spaced contact plates located in the arm and adapted to be sequentially contacted with by the downwardly extending portion of the contact arm, means for securing said housing to a liquid container, and means carried by said housing and located within said container whereby the rise and fall of liquid in said container imparts a longitudinal movement to said plunger and contact arm thereby causing said contact arm to sequentially contact with the contact plates.

3. In a gasoline gauge a circuit controller comprising a housing having an arm projecting therefrom, a plunger slidably located in said housing and arm, a contact arm pivotally secured at one end to said plunger and movable longitudinally in said arm, a plurality of longitudinally spaced contact plates located in said arm and adapted to be sequentially contacted with by said contact arm, means for securing said housing to a liquid container, means carried by said housing and located within said container whereby the rise and fall of liquid in said container imparts a longitudinal movement to said plunger and contact arm, and resilient means located in said arm for holding the free end of the contact arm in contact with said contact plates.

4. In a gasoline gauge a circuit controller comprising a housing having an arm projecting radially therefrom, a plunger slidably located in said housing and arm, a contact arm pivotally secured at one end to said plunger and movable longitudinally in said arm, said contact arm having a downwardly extending portion on its free end, contact plates carried by said arm and arranged in step-like formation whereby said contact arm is raised and lowered as it sequentially contacts with the plates, means for securing said housing to a liquid container, and means carried by said housing and located within said container, said means adapted to impart longitudinal movement to the plunger and contact arm as the liquid in the container rises and falls whereby said contact arm is sequentially brought in contact with said contact plates.

In testimony whereof I have affixed my signature.

CYRUS E. HANON.